United States Patent
Hart, Jr.

(10) Patent No.: US 10,000,340 B2
(45) Date of Patent: Jun. 19, 2018

(54) VENTED BUCKET

(71) Applicant: William F. Hart, Jr., Prospect, KY (US)

(72) Inventor: William F. Hart, Jr., Prospect, KY (US)

( * ) Notice: Subject to any disclaimer, the term of this patent is extended or adjusted under 35 U.S.C. 154(b) by 0 days. days.

(21) Appl. No.: 15/819,787

(22) Filed: Nov. 21, 2017

(65) Prior Publication Data

US 2018/0141757 A1    May 24, 2018

Related U.S. Application Data

(60) Provisional application No. 62/425,934, filed on Nov. 23, 2016.

(51) Int. Cl.
*B65G 17/36* (2006.01)
*B65G 17/12* (2006.01)

(52) U.S. Cl.
CPC .......... *B65G 17/36* (2013.01); *B65G 17/126* (2013.01); *B65G 2201/042* (2013.01)

(58) Field of Classification Search
CPC .... B65G 17/126; B65G 17/36; B65G 17/365; B65G 47/58; B65G 2201/042; B65G 2812/02504; B65G 2812/02544; B65G 2812/02742; B65G 2812/02772
USPC ........................................ 198/703, 713, 714
See application file for complete search history.

(56) References Cited

U.S. PATENT DOCUMENTS

| | | | |
|---|---|---|---|
| 2,031,064 A | 2/1936 | Ponting et al. | |
| RE20,586 E | 12/1937 | Ponting et al. | |
| 2,169,750 A | 8/1939 | Weller | |
| 2,501,229 A | 3/1950 | Lindfors | |
| 2,531,192 A * | 11/1950 | Bergstrom | B01J 8/10 165/101 |
| 2,545,377 A * | 3/1951 | Parisi | B65G 15/44 198/705 |
| 2,584,025 A * | 1/1952 | Kelsey | B65G 47/00 198/704 |
| 2,789,684 A * | 4/1957 | Montgomery | B65G 17/126 198/703 |
| 2,944,657 A | 7/1960 | Davis | |
| 2,973,854 A | 3/1961 | Roloson | |
| 3,688,893 A * | 9/1972 | Wallace, Jr. | B65G 17/126 198/509 |
| 4,129,209 A * | 12/1978 | Mayfeld | B65G 17/42 198/712 |
| 4,246,999 A | 1/1981 | Bryant et al. | |
| 4,558,602 A | 12/1985 | Redding | |
| 4,688,669 A | 8/1987 | Wobick et al. | |
| 4,770,288 A | 9/1988 | Kruger | |
| 5,336,417 A * | 8/1994 | Hannum | B01D 21/18 198/713 |
| 6,695,127 B1 | 2/2004 | Dobranski | |
| 9,181,038 B1 | 11/2015 | Niemi | |

(Continued)

*Primary Examiner* — Gene O Crawford
*Assistant Examiner* — Keith Campbell
(74) *Attorney, Agent, or Firm* — Bingham Greenebaum Doll LLP; Brian W. Chellgren; James C. Eaves, Jr.

(57) ABSTRACT

A vented bucket for use in an endless conveyor system, such as the conveyor belt of a grain elevator or feed elevator, includes two oppositely disposed side panels joined by a rear panel, a bottom panel, and a front panel. At least one vent tube extends along or within one of the rear panel, side panels or front panel in a substantially vertical orientation.

12 Claims, 12 Drawing Sheets

(56) References Cited

U.S. PATENT DOCUMENTS 9,205,988 B2 12/2015 Furthmann et al.
9,248,970 B2 2/2016 Schneider et al.

\* cited by examiner

VENTED BUCKET

CROSS-REFERENCE TO RELATED APPLICATION

The present invention claims the benefit of priority to U.S. Provisional Patent Application No. 62/425,934 for VENTED BUCKET, filed Nov. 23, 2016, incorporated herein by reference.

FIELD OF THE INVENTION

This disclosure relates to a vented bucket for use in an endless conveyor system, such as a bucket elevator. More specifically, the disclosed vented bucket includes two oppositely disposed side panels joined by a rear panel, a bottom panel, and a front panel. At least one vent tube extends along or within one of the rear panel, side panels or front panel in a substantially vertical orientation. The vent tube facilitates loading material into the vented bucket by allowing air trapped between the bottom of the bucket and the incoming material to escape into a lower opening of the vent tube and exit via an upper opening of the vent tube. The vent tube further facilitates unloading material from the vented bucket by providing a pathway for air to reach the bottom of the bucket, inhibiting formation of a vacuum between the bottom of the bucket and the exiting material.

BACKGROUND OF THE INVENTION

This invention relates in general to transportation containers for use with endless conveyor systems, and in particular to vented buckets for use with bucket elevators. Bucket elevators are commonly used in the grain and feed industries, among others, to transport flowable bulk material from an initial deposit location to a distribution location at a height above the deposit location. The deposit location may be, for example, where a farmer makes his delivery to a grain elevator and the distribution location may be, for example, the starting point of the grain-processing cycle at the elevator. At the deposit location, the grain is accumulated in a housing through which an endless conveyor belt passes. Buckets on this endless conveyor belt scoop up the grain and carry it to a higher point. As a container reaches the top of the conveyor belt path and begins its downward travel, the grain in the container is discharged into a head area that is in communication with the distribution location.

Traditional buckets commonly face two challenges when used in endless conveyor systems, such as in grain elevators. First, when loading material into the bucket, air can become trapped between the bottom of the bucket and the incoming material. This trapped pocket of air decreases the volume of material which can be carried in the bucket. Second, when unloading material from the bucket, a vacuum may form between the bottom of the bucket and the exiting material. This vacuum causes material to be retained in the bucket, decreasing the rate of emptying the bucket. These challenges are typically addressed in the industry by incorporating a plurality of vent holes in the bottom of buckets. Vent holes provide a pathway for air to reach and escape from a position between the bottom of the bucket and material loaded in the bucket. Vent holes provide a solution to these challenges, but the solution is not ideal. During normal operation, a relatively small amount of material may escape from a loaded bucket through the vent holes. However, should the elevator pause or cease operation, loaded buckets will empty their material into the bottom of the bucket elevator, potentially plugging the elevator and preventing movement of the conveyor system. It was realized by the inventor that improvements in elevator buckets are needed to address these challenges and provide other important advantages.

SUMMARY

The disclosed vented buckets address these challenges and provides multiple benefits to a user. More specifically, the disclosed vented buckets lack vent holes in the bottom of the bucket and instead includes an alternative means for providing a pathway for air to reach and escape from a position between the bottom of the bucket and material loaded into the bucket. Unlike traditional buckets containing vent holes, material will not empty from the disclosed vented buckets should the elevator pause or cease operation. In some embodiments, the present invention comprises a vented bucket including two oppositely disposed side panels joined by a rear panel, a bottom panel, and a front panel; and at least one vent tube extending in a substantially vertical orientation along a support panel; wherein the support panel is one of the rear panel, front panel and side panels. In further embodiments, the at least one vent tube is a plurality of vent tubes. In certain embodiments, the at least one vent tube includes a lower opening in communication with an upper opening. In some embodiments, the lower opening is located in proximity to a joint between the bottom panel and the support panel. In certain embodiments, the vented bucket includes a water level and the upper opening is located above the water level. In further embodiments, the upper opening is located at or above a top of the support panel. In certain embodiments, the at least one vent tube extending along the support panel extends beside the support panel. In some embodiments, the at least one vent tube extending along the support panel extends through the support panel. In further embodiments, the rear panel, bottom panel and front panel are formed as a single integral member. In certain embodiments, the rear panel, bottom panel, front panel and side panels are formed as a single integral member. In some embodiments, the support panel is the rear panel. In further embodiments, the bucket includes a support member, wherein the at least one vent tube is attached to the support member and wherein the support member is attached to the support panel. In certain embodiments, the support member is located between the at least one vent tube and the support panel. In some embodiments, the bucket includes at least one mounting hole extending through the support member and the support panel.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
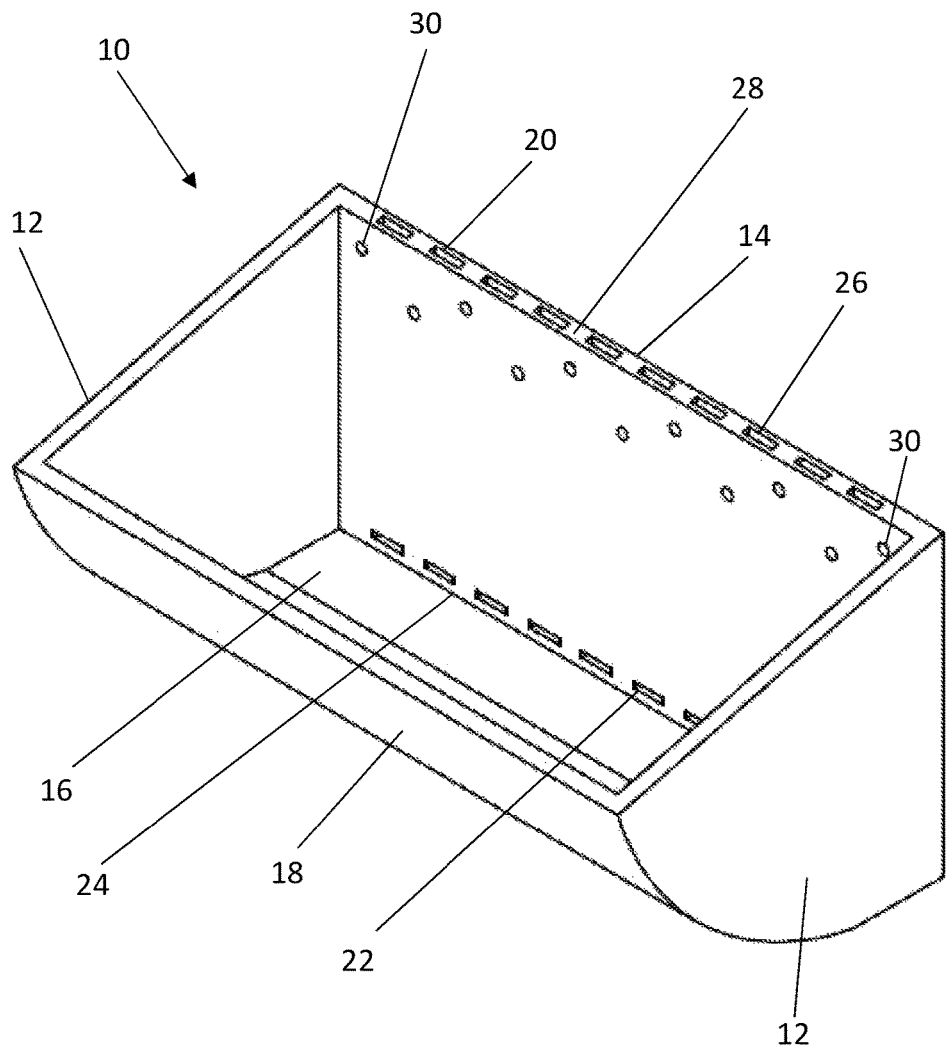
FIG. 1A depicts a top perspective view of a first embodiment of a vented bucket.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

The word "bucket," as used herein, is a term of art when used in connection with bucket elevators, and refers to an open-topped container carried by such an elevator. The term is not intended to limit the container to a cylindrical shape with a flat bottom. In some embodiments, as shown in the drawings, the bucket may include two oppositely disposed side panels joined by a rear panel, a bottom panel, and a front panel. In other embodiments, the bucket may be substantially cylindrical in shape, wherein the side panels, front panel and rear panel are a single curved piece. In further embodiments, the bucket may be substantially triangular in shape, wherein an edge of each side panel joins the rear panel and another edge of each side panel joins the other side panel, such that the side panels cooperatively form bottom and front panels. In certain embodiments, the bucket may include two oppositely disposed side panels joined by a rear panel, and a single panel abutting the rear panel and side panels functions as a bottom panel and front panel. In further embodiments, the bucket may an open-topped container of other geometric or non-geometric shape.

Elevator buckets are available in a range of sizes and shapes. Buckets are typically described in terms of the dimensions of their openings (i.e., width×length), their depth (alternatively referred to as height), their "water line", the point below the top of the bucket above which water (or other flowable material) would spill out of the opening, and a capacity, which indicates the volume of the bucket below the water line. An exemplary small elevator bucket may be 3"×2", with a depth of 2", a water line depth of ⅜", and a capacity of 6.0 cu. in. An exemplary large elevator bucket may be 20"×9", with a depth of 7 and ¾", a water line depth of 1 and ¼", and a capacity of 433.3 cu. in. Larger, smaller, and intermediate sized elevator buckets are generally known in the art. Given standard manufacturing tolerances, dimensions may be accurate within ¼" or ⅛" or within ±10% or ±3%.

The words "vent tube" or "tube," as used herein, refer to a hollow body for conveyance of gases. As shown in the accompanying drawings, the disclosed vent tube is not limited to a cylindrical body and may have a rectangular or other non-circular shape in cross-section.

Figure 1B:
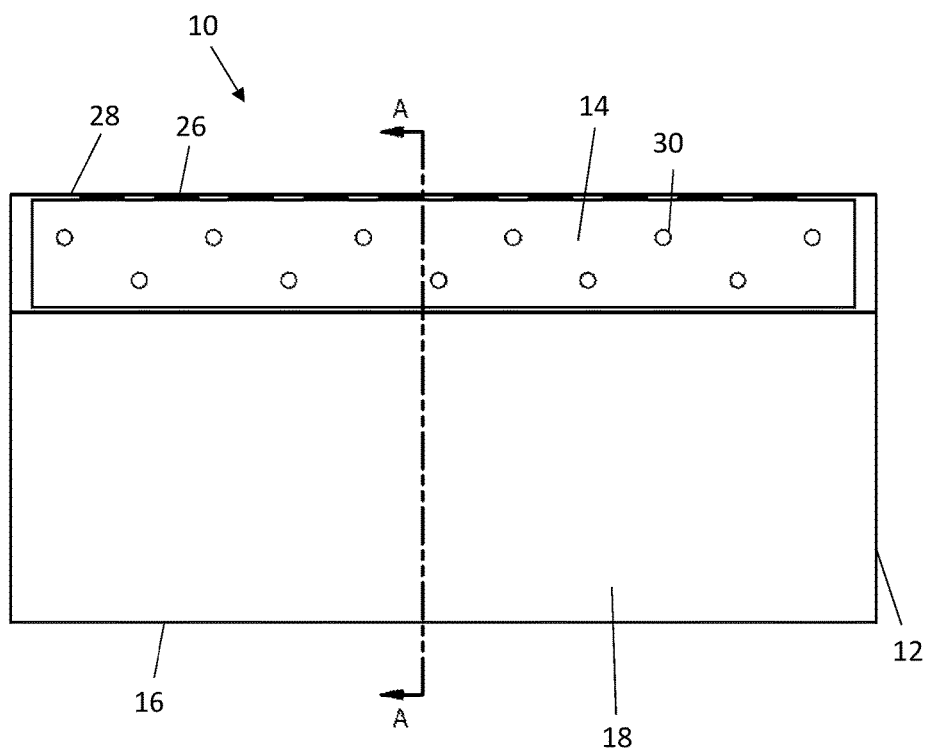
FIG. 1B depicts a front elevation view of the first embodiment of the vented bucket.
Figure 1C:
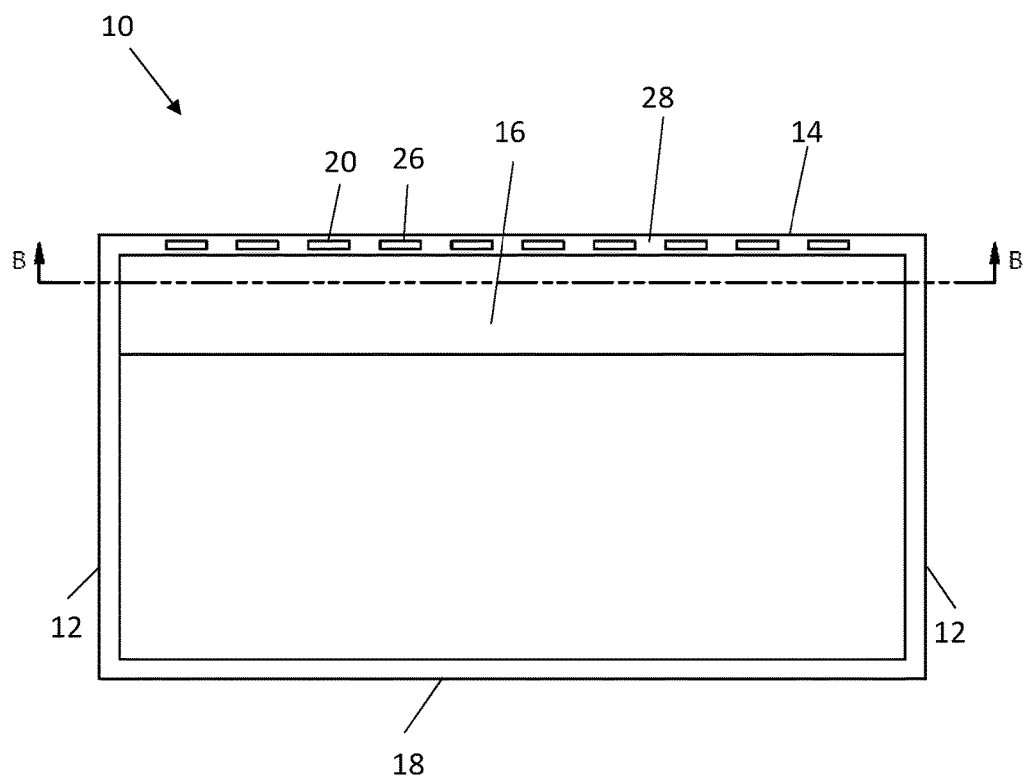
FIG. 1C depicts a top plan view of the first embodiment of the vented bucket.
Figure 1D:
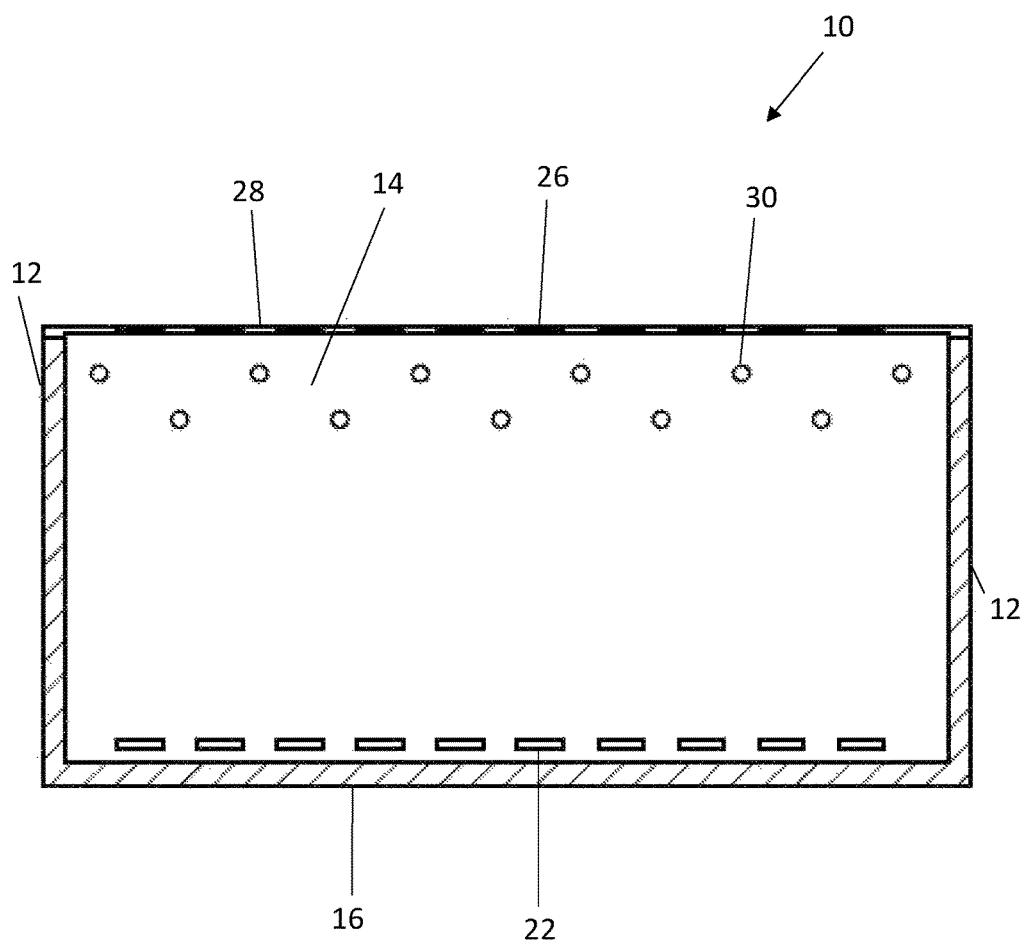
FIG. 1D depicts a sectional front elevation view of the first embodiment of the vented bucket along line B-B of FIG. 1C.
Figure 1E:
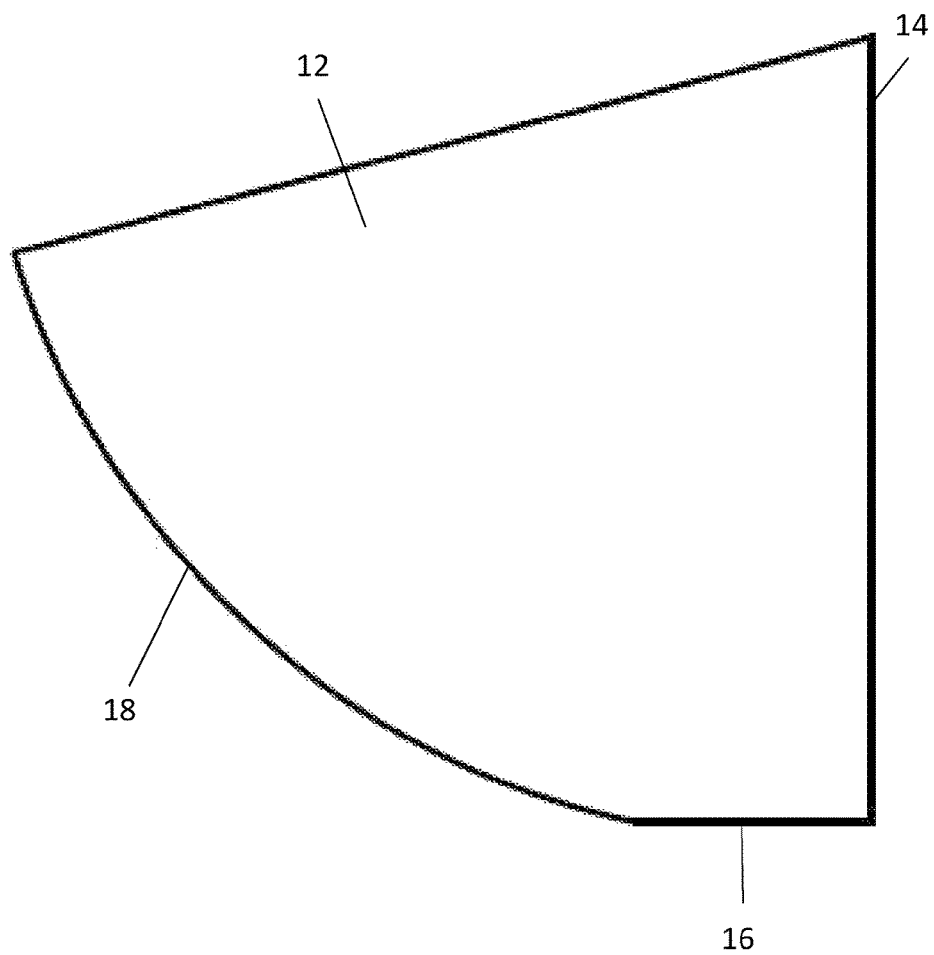
FIG. 1E depicts a side elevation view of the first embodiment of the vented bucket.
Figure 1F:
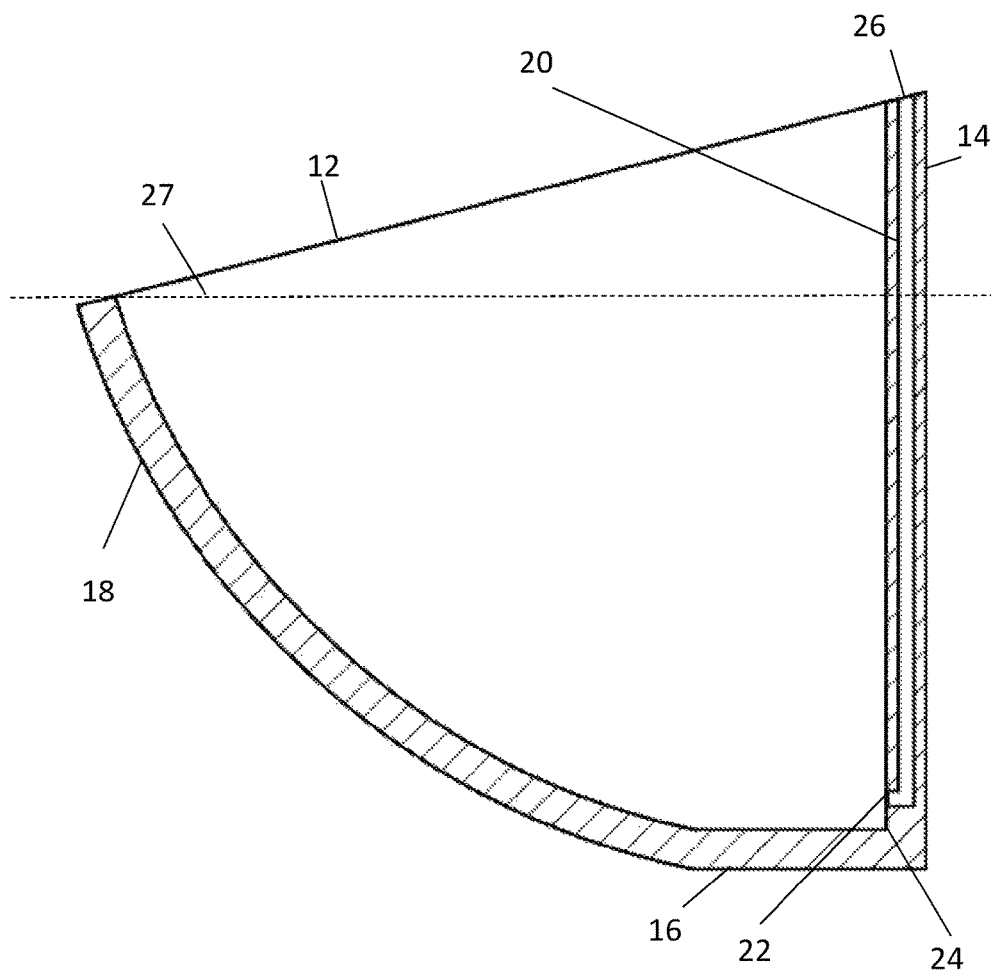
FIG. 1F depicts a sectional side elevation view of the first embodiment of the vented bucket along line A-A of FIG. 1B.

Referring to FIGS. 1A-1F, a first embodiment of a vented bucket 10 includes two oppositely disposed side panels 12 joined by a rear panel 14, a bottom panel 16, and a front panel 18. The front panel 18 is curved in the depicted embodiment, providing the vented bucket 10 with a scoop-like shape. In other embodiments, the front panel 18 may be straight, providing the bucket 10 with a wedge-like shape or rectangular shape.

The bucket 10 further includes at least one vent tube 20 extending substantially vertically through the rear panel 14. As used herein, "substantially vertically" indicates that the at least one vent tube 20 extends parallel or within 10 degrees of parallel to the direction of the height of the relevant panel. Each vent tube 20 includes a lower opening 22 located below the water level 27 of the bucket 10 and an upper opening 26 located above the water level 27. In the depicted first embodiment, each lower opening 22 is located in proximity to the joint 24 between the bottom panel 16 and the rear panel 14. In various embodiments, "proximity" refers to the lower opening 22 being located within 2 inches, within 1 inch, within ½ inch, within ¼ inch, or within ⅛ inch of the joint 24. In some embodiments of buckets, where the rear panel and bottom panel are integral or otherwise do not possess a distinct joint, the lower opening may be located in proximity to the lowest point on the rear panel. In the depicted first embodiment, the upper opening 26 is located at the top 28 of the rear panel 14. The vent tubes 20 provide passageways for air to move to and from the bottom of the bucket 10 when the bucket 10 contains material. This first embodiment includes ten vent tubes 20 each with a rectangular cross-section. In other embodiments, a bucket 10 may include additional or fewer vent tubes 20 as may be advantageous to effectively ventilate the bottom of the bucket 10 and the vent tubes 20 may have different shaped cross sections. In some embodiments, the vent tubes 20 include screens (not shown), such as, for example, wire mesh, positioned across the lower openings 22, upper openings 26, or both openings 22, 26 to restrict material from entering and clogging the vent tubes 20. The vent tubes 20 are sized to fit within the rear panel 14 which, in some embodiments, may have a thickness of ½ inch to ⅛ inch. Heavy duty buckets with thicker panels and light duty buckets with thinner panels are also known in the art.

The rear panel 14 of the bucket includes at least one mounting hole 30 for attaching the bucket to a suitable conveyor belt. In some embodiments, bolts, screws, or other fasteners are inserted through a plurality of mounting holes 30 to attach the bucket 16 to a conveyor system. The mounting holes 30 are preferably positioned not to impinge upon the vent tubes 20.

Figure 2A:
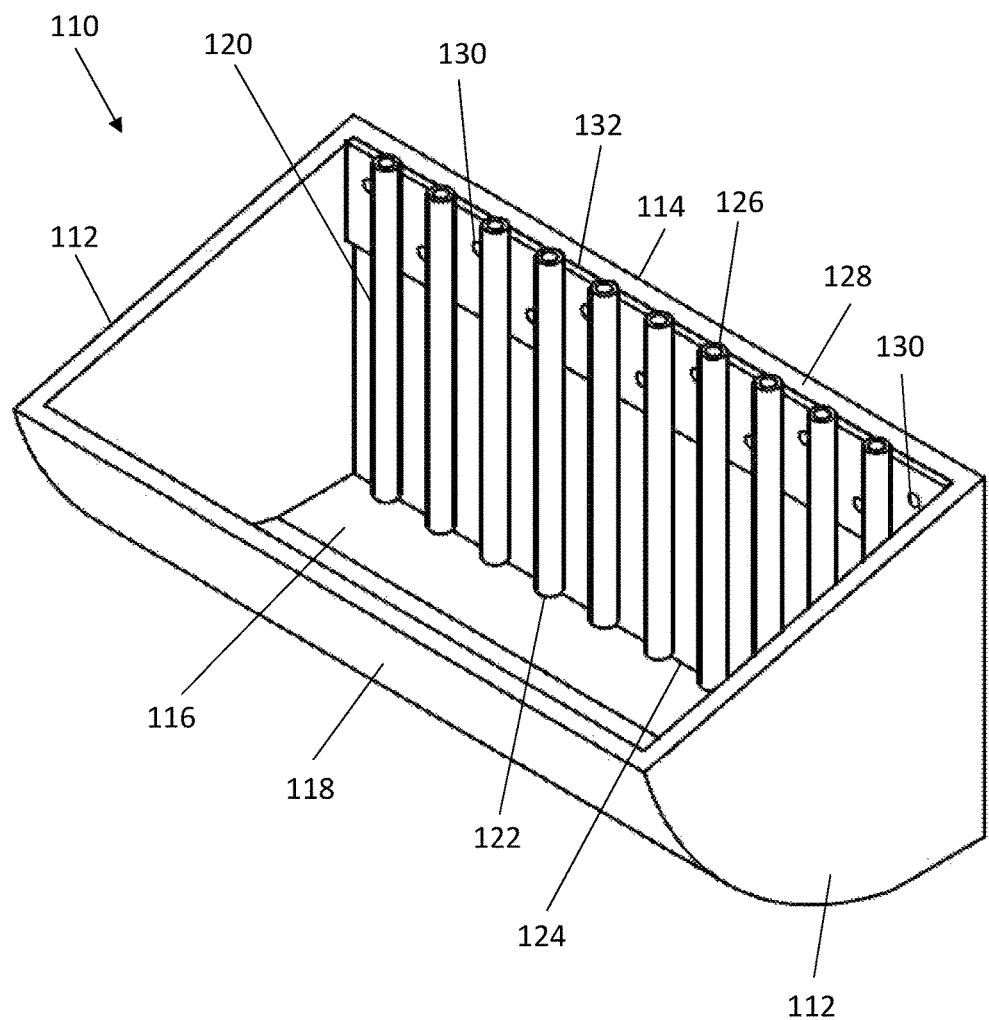
FIG. 2A depicts a top perspective view of a second embodiment of a vented bucket.
Figure 2B:
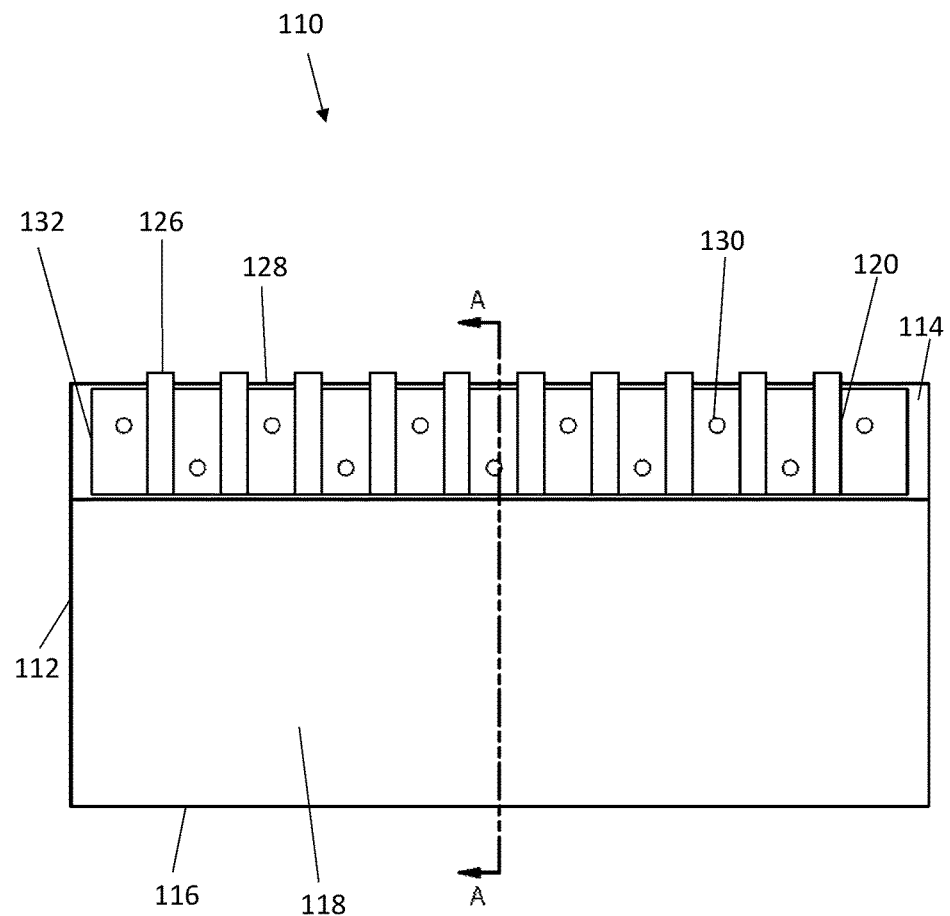
FIG. 2B depicts a front elevation view of the second embodiment of the vented bucket.
Figure 2C:
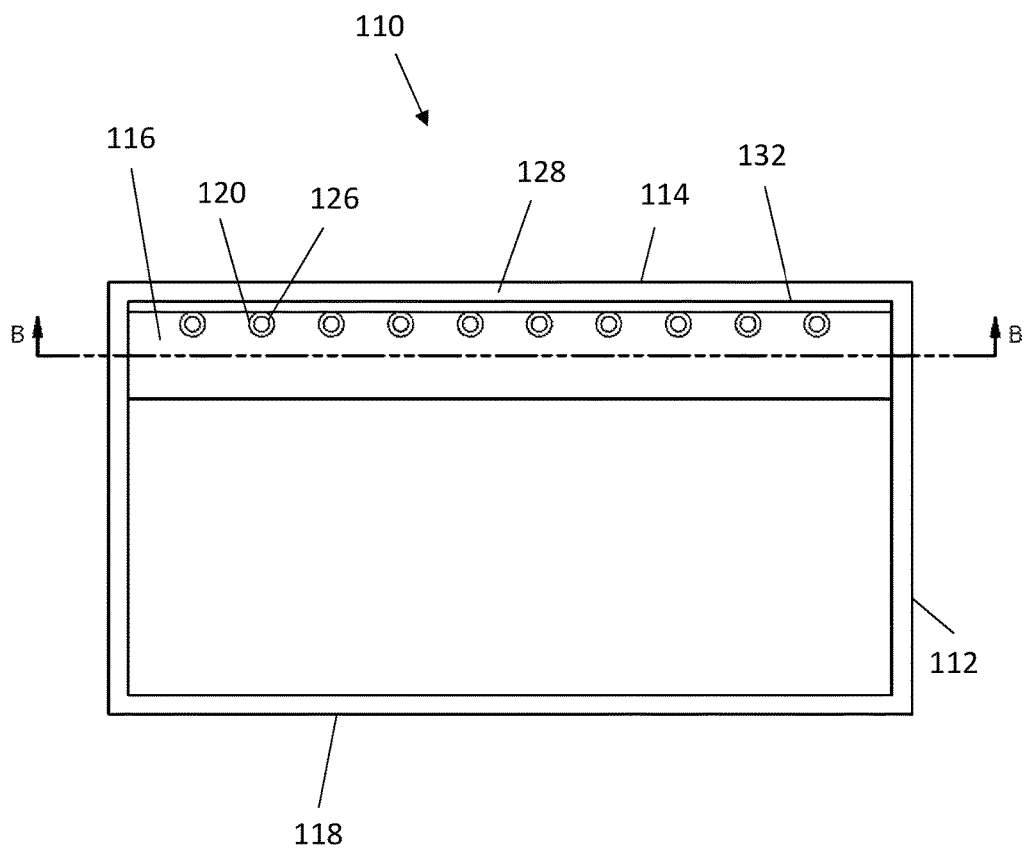
FIG. 2C depicts a top plan view of the second embodiment of the vented bucket.
Figure 2D:
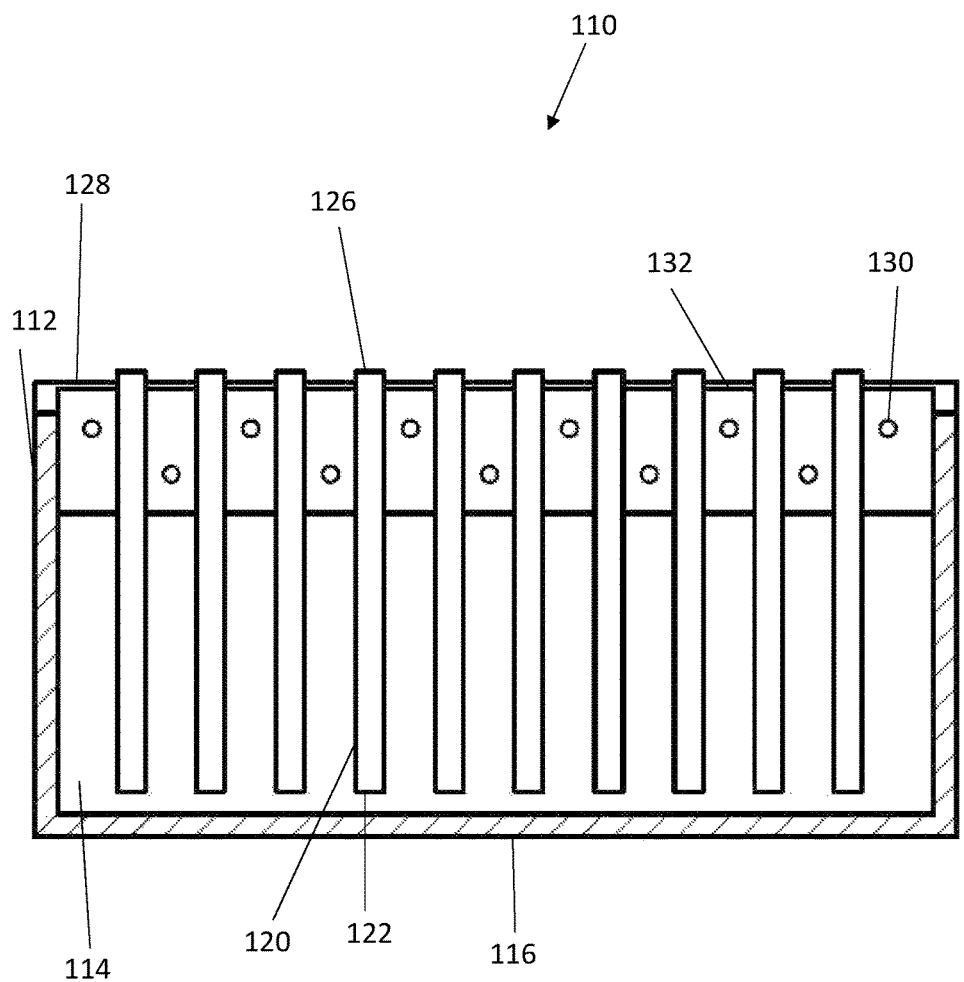
FIG. 2D depicts a sectional front elevation view of the second embodiment of the vented bucket along line B-B of FIG. 2C.
Figure 2E:
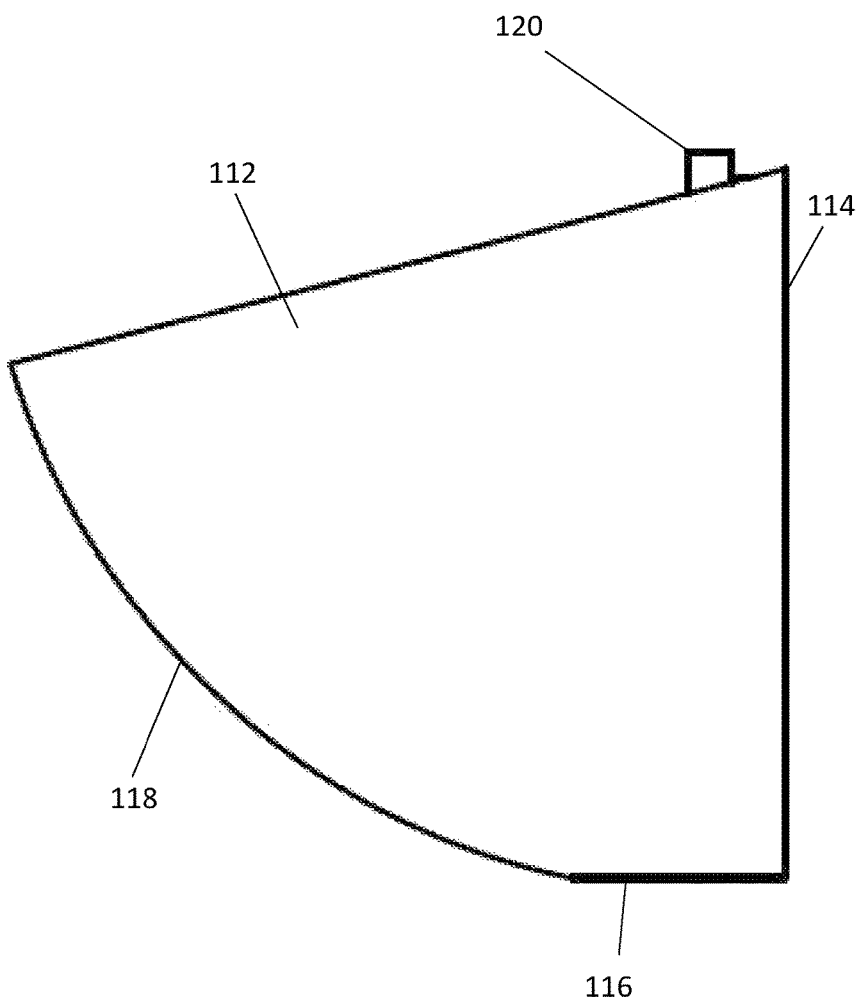
FIG. 2E depicts a side elevation view of the second embodiment of the vented bucket.
Figure 2F:
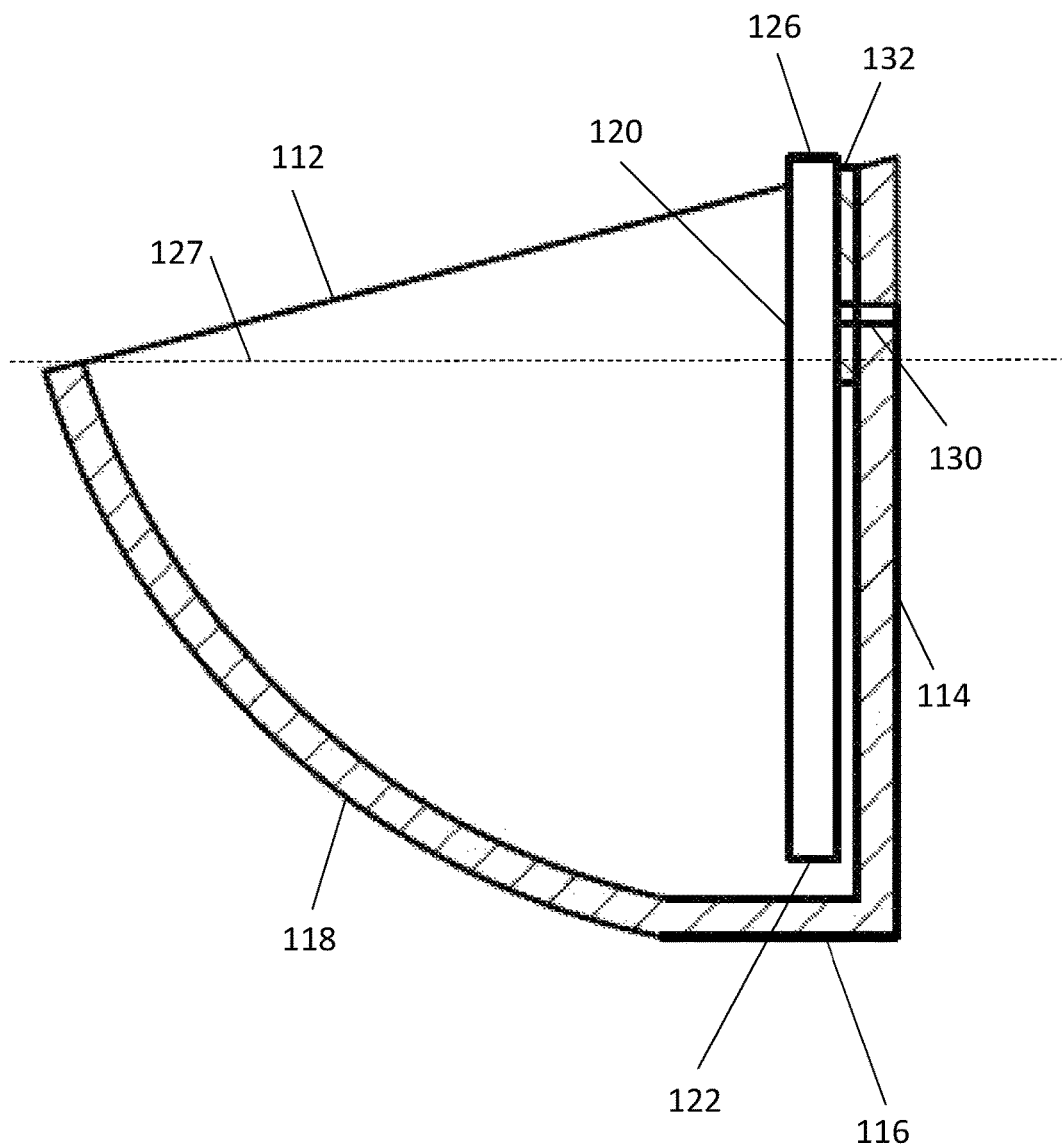
FIG. 2F depicts a sectional side elevation view of the second embodiment of the vented bucket along line A-A of FIG. 2B.

Referring to FIGS. 2A-2F, a second embodiment of a vented bucket 110 includes two oppositely disposed side panels 112 joined by a rear panel 114, a bottom panel 116, and a front panel 118. A support member 132 is attached to the rear panel 114. At least one mounting hole 130 for attaching the bucket 110 to a suitable conveyor system extend through the support member 132 and the support panel, in this second embodiment, the rear panel 114. At least one vent tube 120 is attached to the support member 132. In some embodiments, metal vent tubes may be welded to a metal support member. In other embodiments, vent tubes may be attached to the support member via an adhesive. In further embodiments, the vent tubes and support member may be formed as a single integral member, such as, for example, via injection molding. In certain embodiments, vent tubes may be attached directly to the rear panel or other panels, omitting the support member. The mounting holes 130 are preferably positioned on the rear panel 114 in locations selected not to impinge upon the vent tubes 120.

The vent tubes 120 extend substantially vertically beside the rear panel 114. Each vent tube 120 includes a lower opening 122 located in proximity to the joint 124 between the bottom panel 116 and the rear panel 114. Each vent tube 120 also includes an upper opening 120 located above the water level 127. In the depicted second embodiment, the upper opening 126 is located above the top 128 of the rear panel 114. The vent tubes 120 provide a passageway for air to move to and from the bottom of the bucket 110 when the bucket 110 contains material. This second embodiment includes ten vent tubes 120 each with a circular cross-section. In other embodiments, a bucket 110 may include additional or fewer vent tubes 120 as may be necessary to effectively ventilate the bottom of the bucket 110 and the vent tubes 120 may have non-circular cross-sections. In some embodiments, the vent tubes 120 include screens (not shown), such as, for example, wire mesh, positioned across the lower opening 122, upper opening 126, or both openings 122, 126 to restrict material from entering and clogging the vent tubes 120. In other embodiments, the vent tubes 120 may include balls sized to roll within the tubes 120 and mechanically force material out of the tubes 120. In such embodiments, the openings 122, 126 may optionally be sized smaller than the diameter of the balls to retain the balls within the vent tubes 120.

In the first embodiment, the bottom panel 16, front panel 18, side panels 12 and rear panel 14 with integrated vent tubes 20 are formed as a single integral member. In the second embodiment, the support member 132 and vent tubes 120 may be attached to an existing bucket to create a vented bucket 110. For example, a user may drill holes in the rear panel 114 of an existing bucket 110 at locations corresponding to the mounting holes 130 on the support member 132. Fasteners, such as bolts or screws, may be inserted into the mounting holes 130, passing through the support member 132 and the rear panel 114 of the bucket 110 and into a suitable conveyor belt or chain to attach the support member 132 and vent tubes 120 to the bucket 110 and attach the bucket 110 to the conveyor system.

In the first and second embodiments, the vent tubes 20, 120 extend along a panel of the bucket 10, 110. In both depicted embodiments, the rear panel 14, 114 serves as the support panel for the vent tubes 20, 120. In other embodiments, the support panel may be one or both of the side panels 12, 112, the front panel 18, 118, the rear panel 14, 114 or a combination thereof.

The foregoing detailed description is given primarily for clearness of understanding and no unnecessary limitations are to be understood therefrom, for modifications can be made by those skilled in the art upon reading this disclosure and may be made without departing from the spirit of the invention.

What is claimed is:

1. A vented bucket comprising:
   two oppositely disposed side panels joined by a rear panel, a bottom panel, and a front panel;
   at least one vent tube extending in a substantially vertical orientation along a support panel, wherein the support panel is one of the rear panel, front panel and side panels; and
   a support member, wherein the at least one vent tube is attached to the support member and wherein the support member is attached to the support panel.

2. The vented bucket of claim 1, wherein the at least one vent tube is a plurality of vent tubes.

3. The vented bucket of claim 1, wherein the at least one vent tube includes a lower opening in communication with an upper opening.

4. The vented bucket of claim 3, wherein the lower opening is located in proximity to a joint between the bottom panel and the support panel.

5. The vented bucket of claim 3, wherein the vented bucket includes a water level, and wherein the upper opening is located above the water level.

6. The vented bucket of claim 3, wherein the upper opening is located at or above a top of the support panel.

7. The vented bucket of claim 1, wherein the at least one vent tube extending along the support panel extends beside the support panel.

8. The vented bucket of claim 1, wherein the rear panel, bottom panel and front panel are formed as a single integral member.

9. The vented bucket of claim 1, wherein the rear panel, bottom panel, front panel and side panels are formed as a single integral member.

10. The vented bucket of claim 1, wherein the support panel is the rear panel.

11. The vented bucket of claim 1, wherein the support member is located between the at least one vent tube and the support panel.

12. The vented bucket of claim 1, further comprising at least one mounting hole extending through the support member and the support panel.

\* \* \* \* \*